United States Patent

Friedrich et al.

[11] 4,051,134
[45] Sept. 27, 1977

[54] REACTIVE DYESTUFFS

[75] Inventors: Adolf Friedrich, Leverkusen; Horst Harnisch, Cologne; Roderich Raue, Leverkusen, all of Germany

[73] Assignee: Bayer Aktiengesellschaft, Leverkusen, Germany

[21] Appl. No.: 633,781

[22] Filed: Nov. 20, 1975

[30] Foreign Application Priority Data

Nov. 23, 1974  Germany .............................. 2455615

[51] Int. Cl.$^2$ .......................................... C07D 401/10
[52] U.S. Cl. ............................... 544/217; 260/250 Q; 260/256.5 R; 260/281 S; 544/126
[58] Field of Search ..................... 260/256.5 R, 281 S, 260/250 Q, 249.5

[56]  References Cited
U.S. PATENT DOCUMENTS

| 3,308,127 | 3/1967 | Senshu | 260/281 |
| 3,310,564 | 3/1967 | Kasai | 260/281 |
| 3,330,834 | 7/1967 | Senshu et al. | 260/281 |

OTHER PUBLICATIONS

Japanese Patent Application Publication 15296/69.

*Primary Examiner*—Leonard Schenkman
*Attorney, Agent, or Firm*—Plumley and Tyner

[57] ABSTRACT

Reactive dyestuffs of the formula

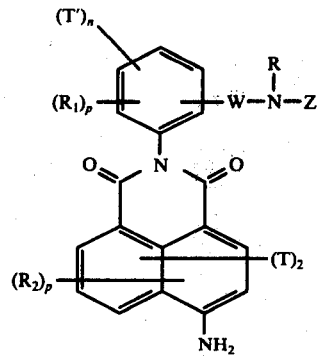

wherein W, T, T', $n$, R, $R_1$, $R_2$, $p$ and Z have the meaning given in the description, their preparation and their use for dyeing and printing materials containing N and materials containing hydroxyl groups, especially fibre materials. The dyestuffs are particularly suitable as fluorescent dyestuffs for dyeing or printing natural and synthetic polyamides and natural and regenerated cellulose, especially cotton. They combine a high fixing yield with outstanding wet fastness properties.

2 Claims, No Drawings

REACTIVE DYESTUFFS

The subject of the present invention are reactive dyestuffs of the formula

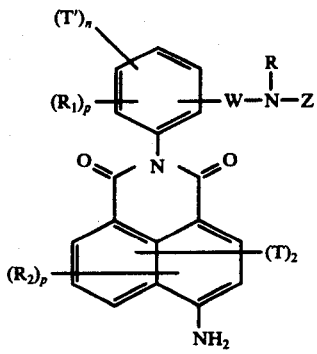
(1)

wherein
W = a direct bond or a divalent radical,
T and T' = a sulphonic acid group or its salt,
n = O or 1,
R = hydrogen, alkyl, aryl, arylalkyl or cycloalkyl, if n = 1, or sulphoalkyl, sulphoaryl, sulphoarylalkyl or sulphocycloalkyl if n = 0,
$R_1$ and $R_2$ = hydrogen or a non-ionic substituent,
p = 1 to 3 and
Z = a reactive group, especially a reactive group which is free from groups which confer solubility in water,
as well as processes for their preparation, and their use for dyeing and printing materials containing N, and materials containing hydroxyl groups, especially fibre materials.

Possible divalent radicals W are, in particular, an alkylene radical with 1 to 4 C atoms, such as methylene, ethylene or i-propylene, a cycloalkylene radical with up to 8 C atoms and containing 5 to 6 ring members, such as cyclohexylene, and optionally substituted phenylene.

The sulphonic acid radicals T and T' can be present as the free acid, as the inner salt or in the form of their readily soluble salts, especially the alkali metal salts or ammonium salts, or the Li, Na or K salts.

The alkyl, arylalkyl, aryl and cycloalkyl radicals R can optionally contain further customary substituents, for example halogen, such as Cl and Br, alkoxy especially $C_1-C_4$-alkoxy, hydroxyl, nitro and optionally functionally modified carboxyl groups, such as, for example, ester, nitrile or carboxylic acid amide groups.

Examples of suitable alkyl radicals R are methyl, ethyl, propyl and butyl as well as their hydroxyl, methoxy and ethoxy derivatives; the methyl and ethyl radical are particularly preferred.

Examples of suitable aralkyl radicals R are benzyl, phenethyl and their methyl, ethyl, methoxy, ethoxy and chlorine derivatives.

Examples of suitable aryl radicals R are phenyl, tolyl, xylyl, hydroxyphenyl, methoxyphenyl and ethoxyphenyl.

Examples of suitable cycloalkyl radicals R are cyclopentyl, cyclohexyl and their methyl and ethyl derivatives.

Examples of suitable sulphoalkyl radicals R are sulphomethyl, β-sulphoethyl, γ-sulpho-n-propyl and ω-sulphobutyl, whilst examples of suitable sulphoaryl and sulphoaralkyl radicals R are sulphophenyl, sulphotolyl, sulphobenzyl and sulphophenethyl. Sulphoalkyl radicals with 1 to 4 C atoms are particularly preferred.

Reactive groups which are suitable according to the invention and which contain at least one removable substituent bonded to a heterocyclic radical or to an aliphatic radical are, inter alia, those which contain at least one reactive substituent bonded to a 5-membered or 6-membered heterocyclic ring, such as to a monazine, diazine or triazine ring, for example a pyridine, pyrimidine, pyridazine, pyrazine, thiazine, oxazine or asymmetrical or symmetrical triazine ring, or to a ring system of the same type which contains one or more fused aromatic rings, such as a quinoline, phthalazine, cinnoline, quinazoline, quinoxaline, acridine, phenazine and phenanthridine ring system; the 5-membered or 6-membered heterocyclic rings which possess at least on reactive substituent are accordingly preferably those which contain one or more nitrogen atoms and can contain fused 5-membered or preferably 6-membered carbocyclic rings.

Examples of reactive substituents on the heterocyclic ring which should be mentioned are: halogen (Cl, Br or F), ammonium, including hydrazinium, sulphonium, sulphonyl, azido($N_3$), thiocyanato, thio, thioether, oxyether, sulphinic acid and sulphonic acid. In detail, the following examples should be mentioned:

Monohalogeno- or dihalogeno-symmetrical-triazinyl radicals, for example 2,4-dichlorotriazinyl-6-, 2-amino-4-chlorotriazinyl-6-, 2-alkylamino-4-chlorotriazinyl-6-, such as 2-methylamino-4-chlorotriazinyl-6-, 2-ethylamino- or 2-propylamino-4-chlorotriazinyl-6-, 2-β-hydroxyethylamino-4-chlorotriazinyl-6-, 2-di-β-hydroxyethylamino-4-chlorotriazinyl-6- and the corresponding sulphuric acid half-esters, 2-diethylamino-4-chlorotriazinyl-6-, 2-morpholino- or 2-piperidino-4-chlorotriazinyl-6-, 2-cyclohexylamino-4-chlorotriazinyl-6-, 2-arylamino- and substituted arylamino-4-chlorotriazinyl-6-, such as 2-phenylamino-4-chlorotriazinyl-6-, 2-(o-, m- or p-carboxy- or sulpho-phenyl)-amino-4-chlorotriazinyl-6-, 2-alkoxy-4-chlorotriazinyl-6-, such as 2-methoxy- or ethoxy-4-chlorotriazinyl-6-, 2-(phenylsulphonylmethoxy)-4-chlorotriazinyl-6-, 2-aryloxy-and substituted aryloxy-4-chlorotriazinyl-6-, such as 2-phenoxy-4-chlorotriazinyl-6-, 2-(p-sulphophenyl)-oxy-4-chlorotriazinyl-6-, 2-(o-, m- or p-methyl- or methoxyphenyl)-oxy-4-chlorotriazinyl-6-, 2-alkylmercapto- or 2-arylmercapto- or 2-(substituted aryl)-mercapto-4-chlorotriazinyl-6-, such as 2-β-hydroxyethyl-mercapto-4-chlorotriazinyl-6-, 2-phenylmercapto-4-chlorotriazinyl-6-, 2-(4'-methylphenyl)-mercapto-4-chlorotriazinyl-6-, 2-(2',4'-dinitro)-phenylmercapto-4-chlorotriazinyl-6-, 2-methyl-4-chlorotriazinyl-6-, 2-phenyl-4-chlorotriazinyl-6-, monohalogeno-, dihalogeno- or trihalogeno-pyrimidinyl radicals, such as 2,4-dichloropyrimidinyl-6-, 2,4,5-trichloropyrimidinyl-6-, 2,4-dichloro-5-nitro- or -5-methyl- or -5-carboxymethyl- or -5-carboxy- or -5-cyano- or -5-vinyl- or -5-sulpho- or -5-mono-, -di- or -tri-chloromethyl- or -5-carboalkoxy-pyrimidinyl-6-, 2,6-dichloropyrimidine-4-carbonyl-, 2,4-dichloropyrimidine-5-carbonyl-, 2-chloro-4-methylpyrimidine-5-carbonyl-, 2-methyl-4-chloropyrimidine-5-carbonyl-, 2-methylthio-4-fluoropyrimidine-5-carbonyl-, 6-methyl-2,4-dichloropyrimidine-5-carbonyl-, 2,4,6-trichloropyrimidine-5-carbonyl-, 2,4-dichloropyrimidine-5-sulphonyl-, 2-chloroquinoxaline-3-carbonyl-, 2- or 3-monochloroquinoxaline-6-carbonyl-, 2- or 3-monochloroquinoxaline-6-sulphonyl-, 2,3-dichloroquinoxaline-6-carbonyl-, 2,3-dichloroquinoxaline-6-sulphonyl-, 1,4-dichlorophthalazine-6-sulphonyl- or -6-carbonyl-, 2,4-dichloroquinazoline-7- or -6-sulphonyl- or -carbonyl-, 2- or 3- or 4-(4',5'-dichloropyridazon-6'-yl-1')-phenylsulphonyl- or -carbonyl-, β-(4',5'-dichloropyridazon-6'-yl-1')-ethylcarbonyl-, N-methyl-N-(2,4-dichlorotriazinyl-6-)-carbamyl-, N-methyl-N-(2-methylamino-4-chlorotriazinyl-6)-carbamyl-, N-methyl-N-(2-dimethylamino-4-chlorotriazinyl-6)-carbamyl-, N-methyl- or N-ethyl-N-(2,4-dichlorotriazinyl-6)-aminoacetyl-, N-methyl-N-(2,3-dichloroquinoxaline-6-sulphonyl)-aminoacetyl, N-methyl-N-(2,3-dichloroquinoxaline-6-carbonyl)-aminoacetyl, as well as the corresponding bromine and fluorine derivatives of the abovementioned chlorine-substituted heterocyclic radicals, including, for example, 2-fluoro-4-pyrimidinyl-, 2,6-difluoro-4-pyrimidinyl-, 2,6-difluoro-5-chloro-4-pyrimidinyl, 2-fluoro-5,6-dichloro-4-pyrimidinyl-, 2,6-difluoro-5-methyl-4-pyrimidinyl-, 2,5-difluoro-6-methyl-4-pyrimidinyl-, 2-fluoro-5-methyl-6-chloro-4-pyrimidinyl-, 2-fluoro-5-nitro-6-chloro-4-pyrimidinyl-, 5-bromo-2-fluoro-4-pyrimidinyl-, 2-fluoro-5-cyano-4-pyrimidinyl-, 2-fluoro-5-methyl-4-pyrimidinyl-, 2,5,6-trifluoro-4-pyrimidinyl-, 5-chloro-6-chloromethyl-2-fluoro-4-pyrimidinyl-, 2,6-difluoro-5-bromo-4-pyrimidinyl-, 2-fluoro-5-bromo-6-methyl-4-pyrimidinyl-, 2-fluoro-5-bromo-6-chloromethyl-4-pyrimidinyl-, 2,6-difluoro-5-chloromethyl-4-pyrimidinyl-, 2,6-difluoro-5-nitro-4-pyrimidinyl-, 2-fluoro-6-methyl-4-pyrimidinyl-, 2-fluoro-5-chloro-6-methyl-4-pyrimidinyl-, 2-fluoro-5-chloro-4-pyrimidinyl-, 2-fluoro-6-chloro-4-pyrimidinyl-, 6-trifluoromethyl-5-chloro-2-fluoro-4-pyrimidinyl-, 6-trifluoromethyl-2-fluoro-4-pyrimidinyl-, 2-fluoro-5-nitro-4-pyrimidinyl-, 2-fluoro-5-trifluoromethyl-4-pyrimidinyl-, 2-fluoro-5-phenyl- or -5-methyl-sulphonyl-4-pyrimidinyl-, 2-fluoro-5-carbonamido-4-pyrimidinyl-, 2-fluoro-5-carbomethoxy-4-pyrimidinyl-, 2-fluoro-5-bromo-6-trifluoromethyl-4-pyrimidinyl-, 2-fluoro-6-carbonamido-4-pyrimidinyl-, 2-fluoro-6-carbomethoxy-4-pyrimidinyl-, 2-fluoro-6-phenyl-4-pyrimidinyl-, 2-fluoro-6-cyano-4-pyrimidinyl-, 2,6-difluoro-5-methylsulphonyl-4-pyrimidinyl-, 2-fluoro-5-sulphonamido-4-pyrimidinyl-, 2-fluoro-5-chloro-6-carbomethoxy-4-pyrimidinyl-, and 2,6-difluoro-5-trifluoromethyl-4-pyrimidinyl; triazine radicals containing sulphonyl groups, such as 2,4-bis-(phenylsulphonyl)-triazinyl-6-, 2-(3'-carboxyphenyl)-sulphonyl-4-chlorotriazinyl-6-, 2-(3'-sulphophenyl)-sulphonyl-4-chlorotriazinyl-6- and 2,4-bis-(3'-carboxyphenylsulphonyl-)-triazinyl-6-; pyrimidine rings containing sulphonyl groups, such as 2-carboxymethylsulphonylpyrimidinyl-4-, 2-methyl-sulphonyl-6-methylpyrimidinyl-4-, 2-methylsulphonyl-6-ethyl-pyrimidinyl-4-, 2-phenylsulphonyl-5-chloro-6-methyl-pyrimidinyl-, 2,6-bis-methylsulphonylpyrimidinyl-4-, 2,6-bis-methylsulphonyl-5-chloro-pyrimidinyl-4-, 2,4-bis-methylsulphonyl-pyrimidine-5-sulphonyl-, 2-methylsulphonyl-pyrimidinyl-4-, 2-phenylsulphonyl-pyrimidinyl-4-, 2-trichloromethylsulphonyl-6-methyl-pyrimidinyl-4-, 2-methylsulphonyl-5-chloro-6-methyl-pyrimidinyl-4-, 2-methylsulphonyl-5-bromo-6-methyl-pyrimidinyl-4-, 2-methylsulphonyl-5-chloro-6-ethyl-pyrimidinyl-4-, 2-methylsulphonyl-5-chloro-6-chloromethyl-pyrimidinyl-4-, 2-methylsulphonyl-4-chloro-6-methylpyrimidine-5-sulphonyl-, 2-methylsulphonyl-5-nitro-6-methyl-pyrimidinyl-4-, 2,5,6-tris-methylsulphonyl-pyrimidinyl-4-, 2-methylsulphonyl-5,6-dimethyl-pyrimidinyl-4-, 2-ethylsulphonyl-5-chloro-6-methyl-pyrimidinyl-4-, 2-methylsulphonyl-6-chloropyrimidinyl-4-, 2,6-bis-methylsulphonyl-5-chloro-pyrimidinyl-4-, 2-methylsulphonyl-6-carboxy-pyrimidinyl-4-, 2-methylsulphonyl-5-sulpho-pyrimidinyl-4-, 2-methylsulphonyl-6-carbomethoxy-pyrimidinyl-4-, 2-methylsulphonyl-5-carboxy-pyrimidinyl-4-, 2-methylsulphonyl-5-cyano-6-methoxy-pyrimidinyl-4-, 2-methylsulphonyl-5-chloro-pyrimidinyl-4-, 2-sulphoethylsulphonyl-6-methyl-pyrimidinyl-4-, 2-methylsulphonyl-5-bromopyrimidinyl-4-, 2-phenylsulphonyl-5-chloro-pyrimidinyl-4-, 2-carboxymethylsulphonyl-5-chloro-6-methyl-pyrimidinyl-4-, 2-methylsulphonyl-6-chloropyrimidine-4- and -5-carbonyl-, 2,6-bis-(methylsulphonyl)-pyrimidine-4- or -5-carbonyl-, 2-ethylsulphonyl-6-chloropyrimidine-5-carbonyl-, 2,4-bis-(methylsulphonyl)-pyrimidine-5-sulphonyl- and 2-methylsulphonyl-4-chloro-6-methylpyrimidine-5-sulphonyl- or -carbonyl-; triazine rings containing ammonium groups, such as 2-trimethylammonium-4-phenylamino- or -4-(o-, m- or p-sulphophenyl)-aminotriazinyl-6-, 2-(1,1-dimethylhydrazinium)-4-phenylamino- or -4-(o-, m- or p-sulphophenyl)-aminotriazinyl-6-, 2-(2-isopropylidene-1,1-dimethyl)-hydrazinium-4-phenylamino- or -4-(o-, m- or p-sulphophenyl)-aminotriazinyl-6-, 2-N-aminopyrrolidinium- or 2-N-aminopiperidinium-4-phenylamino- or -4-(o-, m- or p-sulphophenyl)-aminotriazinyl-6-, and also 4-phenylamino- or 4-(sulphophenylamino)-triazinyl-6 -radicals which contain 1,4-bis-azabicyclo-[2,2,2]-octane or 1,2-bisaza-bicyclo-[0,3,3]-octane bonded in the 2-position, via a nitrogen bond, as a quaternary structure, 2-pyridinium-4-phenylamino- or -4-(o-, m- or p-sulphophenyl)-amino-triazinyl-6- as well as corresponding 2-oniumtriazinyl-6- radicals, which are substituted in the 4-position by alkylamino, such as methylamino, ethylamino or β-hydroxyethylamino, or alkoxy, such as methoxy or alkoxy, or aroxy, such as phenoxy or sulphophenoxy groups; 2-chlorobenzthiazole-5- or -6-carbonyl- or -5- or -6-suphonyl-, 2-arylsulphonyl- or -alkylsulphonylbenzthiazole-5- or -6-carbonyl- or -5- or -6-sulphonyl-, such as 2-methylsulphonyl- or 2-ethylsulphonyl-benzthiazole-5- or -6-sulphonyl- or -carbonyl-, 2-phenylsulphonyl-benzthiazole-5- or -6-sulphonyl- or -carbonyl- and the corresponding 2-sulphonylbenzthiazole-5- or -6-carbonyl- or -sulphonyl- derivatives, which contain sulpho groups in the fused benzene ring, 2-chlorobenzoxazole-5- or -6-carbonyl- or -sulphonyl-, 2-chlorobenzimidazole-5- or -6-carbonyl- or -sulphonyl-, 2-chloro-1-methylbenzimidazole-5- or -6-carbonyl- or -sulphonyl-, 2-chloro-5-methylthiazole-(1,3)-5-carbonyl- or -4- or -5-sulphonyl and the N-oxide of 4-chloro- or 4-nitroquinoline-5-carbonyl.

In addition, reactive groups of the aliphatic series should be mentioned, such as acryloyl, monochloroacryloyl, dichloroacryloyl or trichloroacryloyl, such as —CO—CH=CH—Cl, —CO—CCl=CH$_2$ and —CO—CCl=CH—CH$_3$, and also —CO—CCl=CH—COOH, —CO—CH=CCl—COOH, β-chloropropionyl, 3-phenylsulphonylpropionyl, 3-methylsulphonylpropionyl, β-sulphato-ethylaminosulphonyl, vinylsulphonyl, β-chloroethylsulphonyl, β-sulphatoethylsulphonyl, β-methylsulphonyl-ethylsulphonyl, β-phenylsulphonylethylsulphonyl, 2-fluoro-2-chloro-3,3-difluorocyclobutane-1-carbonyl, 2,2,3,3-tetrafluorocyclobutane-carbonyl-1 or -sulphonyl-1, β-(2,2,3,3-tetrafluorocyclobutyl-1)-acryloyl, α- or β-bromoacryloyl or and α- or β-alkyl- or aryl-sulphonylacryloyl group, such as α- or β-methylsulphonylacryloyl.

The reactive groups derived from the nitrogen-containing heterocyclic compounds are preferred. Amongst these, the 2,6-difluoro-5-chloro-4-pyrimidinyl, the 2,3-dichloroquinoxaline-6-carbonyl and the 2,4-dichlorotriazinyl-6 radical are particularly preferred.

Examples of suitable non-ionic substituents $R_1$ and $R_2$ are halogen, such as F, Cl and Br, alkyl with 1 to 6 C atoms, alkoxy with 1 to 6 C atoms, nitro, cyano, carbalkoxy, especially carbo-$C_1$-$C_5$-alkoxy, and optionally substituted phenyl and benzyl.

The compounds of the formula (1) claimed according to the invention are accessible by various processes. One of these consists of the condensation of a compound of the formula (2) or (3)

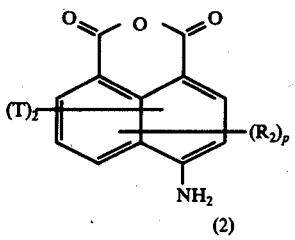

(2)

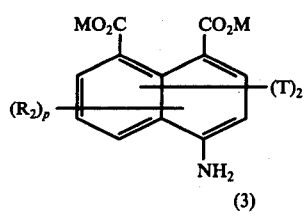

(3)

wherein

T, $R_2$ and $p$ have the indicated meaning and

M represents hydrogen or an alkali metal, with a compound of the formula

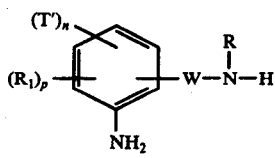

(4)

wherein

T', $n$, W, R, $R_1$ and $p$ have the indicated meaning to give compounds of the formula (5)

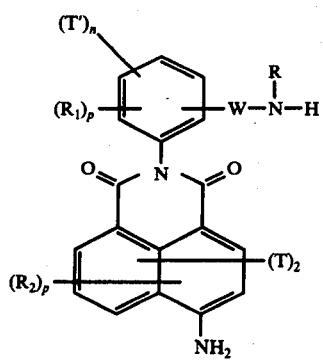

and reaction of the resulting intermediate product (5) with a reactive component which forms the reactive radical Z, whereby a hydrogen atom on the nitrogen atom linked to W is substituted by Z.

The condensation is carried out in an aqueous and/or organic solvent at temperatures between 80° and 180° C, but especially in the temperatures range between 90° and 120° C. Examples of suitable solvents are water, dimethylformamide, 1,4-dioxane, glacial acetic acid, glycol and their mixtures with one another.

A particularly advantageous embodiment of the process for the preparation of (5) is to carry out the condensation of (2) or (3) and (4) in aqueous sodium bisulphite solution under reflux conditions.

The reaction of (5) with the reactive component takes place according to methods which are in themselves known, preferably in aqueous solution at pH values between 2 and 11 and temperatures between 0° and 45° C.

Suitable components corresponding to the formula (4) are, for example, 2,4-diamino-benzenesulphonic acid, 3,5-diamino-benzenesulphonic acid, 2,5-diamino-benzenesulphonic acid, 4-aminodiphenylamine-2-sulphonic acid, 4'-methoxy-4-aminodiphenylamine-2-sulphonic acid, 4,6-diamino-toluene-3-sulphonic acid, 2,6-diamino-toluene-4-sulphonic acid, 6-methylamino-3-amino-benzenesulphonic acid, 6-ethylamino-3-amino-benzenesulphonic acid, 2,4-diamino-toluene-6-sulphonic acid, 6-benzylamino-3-amino-benzenesulphonic acid, methyl-(4-amino-2-sulphobenzyl)-amine, ethyl-(4-amino-2-sulphobenzyl)-amine, n-propyl-(4-amino-2-sulphobenzyl)-amine, N-p-aminophenyl-taurine, N-m-aminophenyl-taurine, N-p-aminobenzyl-taurine and N-m-aminobenzyl-taurine. Methyl- and ethyl-(4-aminosulphobenzyl)-amine and the derivatives of taurine which have been mentioned are particularly preferred.

Examples of suitable compounds (2) and (3) are 4-amino-3,6-disulpho-naphthalic anhydride, 4-amino-2,6-disulpho-naphthalic anhydride and the sodium and potassium salts of the corresponding 1,8-dicarboxylic acids.

A further process for the preparation of the compounds (1) according to the invention is to react compounds of the formula (2) or (3) with compounds of the formula (6)

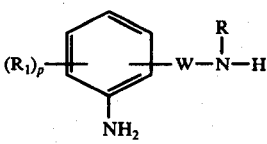

wherein

R, $R_1$, W and $p$ have the meaning mentioned except the meaning wherein the radical R is substituted by a sulphonic acid group, to give compounds of the formula (7)

-continued

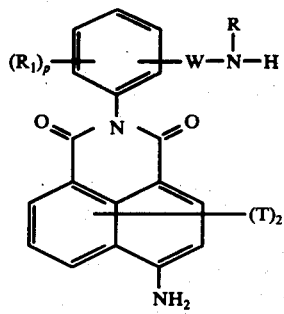

wherein

R, R$_1$, T, W and p have the indicated meaning, these compounds are sulphonated and the products are then reacted with the component which forms the reaction radical Z. The conditions for the reaction of (2) or (3) with (6) are the same as for the reaction of (2) or (3) with (4). A preferred embodiment for the preparation of (7) is that the condensation is carried out in water or aqueous sodium bisulphite solution at the reflux temperature. The sulphonation of the intermediate product (7) is carried out with oleum in the temperature range from 10° to 60° C, especially with 20% strength oleum at 50° C. The further reaction of the sulphonated intermediate product with the component which forms the reactive radical takes place according to methods which are in themselves known, preferably in aqueous solution at pH values between 2 and 11 and temperatures between 0° and 45° C.

Suitable compounds which correspond to the formula (6) are, for example, m-phenylenediamine, p-phenylenediamine, N-methyl-m-phenylenediamine, N-methyl-p-phenylenediamine, N-ethyl-m- and -p-phenylenediamine, N-cyclohexyl-m- and -p-phenylenediamine, 1-methoxy-2,4-diamino-benzene, 1-methyl-2,5-diamino-benzene, 1-methoxy-3,5-diamino-benzene, 4-chloro-m-phenylenediamine, 4-nitro-m-phenylenediamine, N-phenyl-p-phenylenediamine, 4-chloro-2-amino-diphenylamine, 2,4-diaminotoluene, 4-amino-2-ethylamino-toluene, 2,4-diaminophenol, 2-methylamino-4-amino-anisole, 2-ethylamino-4-amino-anisole, 2-methylamino-4-amino-phenetole, 3-aminomethyl-aniline and 4-aminomethyl-aniline. Preferred compounds of the formula (6) are those in which the radical R is an alkyl radical with 1 to 3 C atoms, or hydrogen.

Particularly preferred compounds of the formula (6) are m-phenylenediamine, 2,4-diaminotoluene and N-methyl-p-phenylenediamine.

Within the scope of the compounds according to the invention, compounds of particular industrial importance are those of the formula

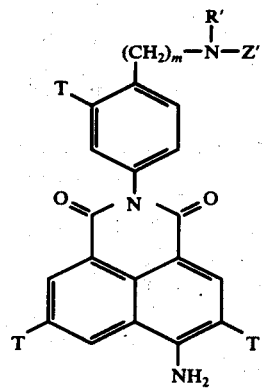

wherein

T has the meaning mentioned and m = 1 or 2,

R' = methyl or ethyl and

Z' = a 2,6-difluoro-5-chloro-pyrimidinyl, 2,3-dichloro-quinoxaline-6-carbonyl or 2,6-dichloro-triazinyl radical.

The compounds according to the invention can be used as dyestuffs, in particular as fluorescent dyestuffs for dyeing or printing fibres of polyamides, for example of natural and especially of synthetic polyamides, and natural and regenerated cellulose, in greenish-tinged yellow colour shades.

The compounds according to the invention find a particularly preferred application as dyestuffs for printing cotton in fluorescent greenish-tinged yellow colour shades. The dyestuffs combine a high fixing yield with outstanding wet fastness properties.

In the examples which follow, the parts denote parts by weight and the percentages denote percentages by weight. The temperatures are given in degrees centigrade.

EXAMPLE 1

40 parts of 4-amino-3,6-disulphonaphthalic anhydride in 500 parts of 20% strength sodium bisulphite solution are heated with 31 parts of methyl-(4-amino-2-sulphobenzyl)-amine to the reflux temperature for 40 hours. The intermediate product which precipitates after cooling the reaction mixture is isolated. It corresponds, in the form of the free trisulphonic acid, to the formula

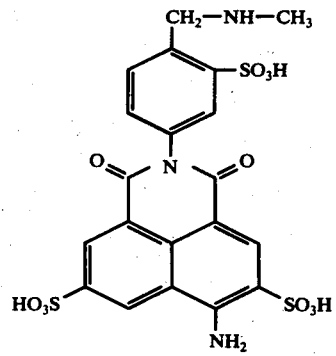

12 parts of this intermediate product are dissolved in 50 parts of water to give a clear solution and are reacted, at room temperature and a pH of 5.5 to 6.5, with 3.5 parts of trifluoro-5-chloropyrimidine. The pH value is kept within the stated range by means of sodium carbonate solution. The dyestuff is isolated by salting out with sodium chloride.

Similar dyestuffs are obtained if instead of methyl-(4-amino-2-sulphobenzyl)-amine an equivalent amount of ethyl-(4-amino-2-sulphobenzyl)-amine, n-propyl-(4-amino-2-sulphobenzyl)-amine, 3-amino-6-aminomethyl-benzenesulphonic acid, 3-amino-6-β-aminoethyl-benzenesulphonic acid or 3-amino-6-β-methyl-aminoethyl-benzenesulphonic acid is used.

EXAMPLE 2

40 parts of 4-amino-3,6-disulphonaphthalic anhydride in 500 parts of water are heated to the reflux temperature and 6 parts of 1,3-diaminobenzene are added over the course of two hours. The mixture is heated under reflux for a further 15 hours and is clarified with active charcoal, and the intermediate product is isolated by salting out with sodium chloride. It corresponds to a sodium salt of the following disulphonic acid:

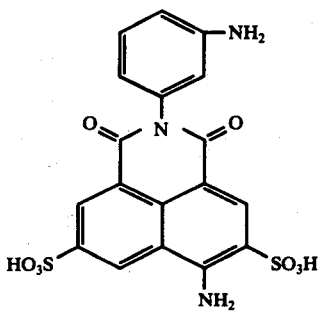

(A)

80 parts of this intermediate product are introduced into 320 parts of 20% strength oleum at room temperature. The reaction mixture is then stirred for 5 hours at 50°- 55° C. It is poured onto 300 parts of ice and the trisulphonic acid is salted out by adding saturated sodium chloride solution.

15 parts of this intermediate product are dissolved in 100 parts of water to give a clear solution and 6 parts of trifluoro-5-chloro-pyrimidine are added at 0° - 5° C whilst stirring and keeping the pH value of the reaction solution at between 6.5 and 6.0 by means of sodium carbonate solution or sodium hydroxide solution. As soon as the pH value is constant at 6.5, the mixture is stirred for a further hour and is filtered, and the dyestuff is salted out with sodium chloride.

Comparably valuable dyestuffs are obtained when the compound (A) is sulphonated in the abovementioned manner and the trisulpho compound is reacted with equivalent amounts of the following reactive components: 2,3-dichloro-quinoxaline-6-carboxylic acid chloride, 2,3-dichloro-quinoxaline-6-sulphonic acid chloride or 2,4,6-trichlorotriazine.

EXAMPLE 3

The procedure followed is as in Example 2 but instead of 1,3-diamino-benzene an equivalent amount of 2,4-diaminotoluene is employed and the intermediate product, which corresponds to a Na salt of the following disulphonic acid (B)

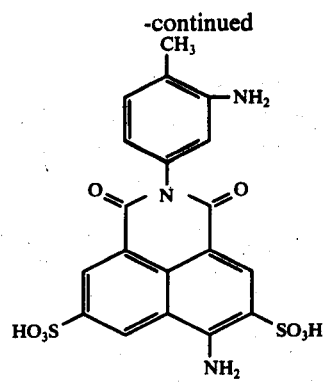

is isolated. 90 parts of this intermediate product (B) are converted to the corresponding trisulpho compound with 20% strength oleum in the same manner as indicated in Example 2. 15 parts of the trisulpho compound are dissolved in 100 parts of water to give a clear solution, which is cooled to 0° - 5° C; at this temperature, 6.5 parts of cyanuric chloride are added progressively whilst at the same time adjusting the pH value to 8 with sodium carbonate solution. When no further sodium carbonate solution is consumed, the mixture is stirred additionally for 2 hours at 0° - 5° C and the dyestuff is isolated by salting out with sodium chloride.

Comparably valuable dyestuffs are obtained if instead of 2,4-diamino-toluene an equivalent amount of 3,5-diaminotoluene, 2,4-diamino-anisole, 2,5-diamino-anisole, 4-chloro-1,3-diaminobenzene, 2,5-diamino-benzonitrile or 3,5-diaminobenzoic acid ethyl ester is employed.

EXAMPLE 4

40 parts of 4-amino-3,6-disulphonaphthalic anhydride in 500 parts of 20% strength sodium bisulphite solution are heated with 27 parts of the sulphuric acid salt of 4-amino-N-methylaniline for 20 hours under reflux. The precipitate which separates out on cooling is isolated. It corresponds to a Na salt of the disulphonic acid of the following structure:

(C)

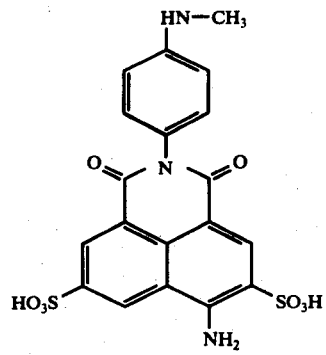

This intermediate product (C) is converted to the corresponding trisulphonic acid in the same manner as indicated in Example 2, and the trisulphonic acid is reacted analogously to the data in Example 3 with cyanuric chloride, to give the reactive dyestuff.

Comparably valuable dyestuffs are obtained if instead of 4-amino-N-methylaniline an equivalent amount of 3-amino-N-ethylaniline, 3-amino-6-chloro-n-ethylaniline, 4-amino-diphenylamine, 4-amino-4'-methoxydiphenylamine or 4-amino-2-N-ethylamino-toluene is employed.

EXAMPLE 5

40 parts of 4-amino-3,6-disulphonaphthalic anhydride in 500 parts of 20% strength sodium bisulphite solution are heated with 22 parts of 2,6-diamino-toluene-4-sulphonic acid for 40 hours under reflux. The precipitate which separates out after cooling the reaction mixture corresponds to a Na salt of the following trisulphonic acid:

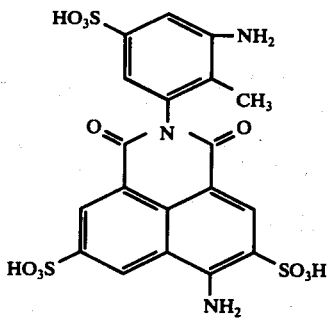

14 parts of this intermediate product are dissolved in 100 parts of water to give a clear solution and reacted with 4 parts of trifluoro-5-chloro-pyrimidine at 0° – 5° C and pH 8. The reactive dyestuff is isolated by salting out with potassium chloride.

Comparable dyestuffs are obtained if instead of 2,6-diamino-toluene-4-sulphonic acid an equivalent amount of 3,5-diamino-benzenesulphonic acid or 4-amino-diphenylamine-4'-sulphonic acid is employed.

EXAMPLE 6

40 parts of 4-amino-3,6-disulphonaphthalic anhydride in 500 parts of 20% strength sodium bisulphite solution are heated with 31 parts of N-(4-aminobenzyl)-taurine for 40 hours under reflux. The intermediate product which precipitates after cooling the reaction mixture is isolated and reacted, analogously to Example 1, with trifluoro-5-chloropyrimidine to give the reactive dyestuff.

Similar dyestuffs are obtained if instead of N-(4-aminobenzyl)-taurine an equivalent amount of N-(p-aminophenyl)-taurine, N-(m-aminobenzyl)-taurine, N-(m-aminophenyl)-taurine, 3-(4-aminophenylamino)-propane-1-sulphonic acid or 3-(3-aminophenylamino)-propane-1-sulphonic acid is used.

EXAMPLE 7

40 parts of the reactive dyestuff prepared according to Example 1 are sprinkled into a mixture composed of 150 parts of urea, 10 parts of sodium bicarbonate, 10 parts of sodium m-nitrobenzenesulphonate and 500 parts of a 2-3% strength alginate thickener. This mixture is made up to 1,000 parts with water or with a mixture of water and the thickener mentioned. The printing paste thus obtained is printed onto mercerised cotton on a roller printing machine and is then dried. It is fixed by treatment with saturated steam for 5–8 minutes in a continuous steamer. After the steaming process, the print obtained is first rinsed in cold water, then treated with boiling water and finally again rinsed and dried. A clear fluorescent print with good fastness properties in use, and a very high fixing yield, is obtained.

I claim:
1. Compound of the formula:

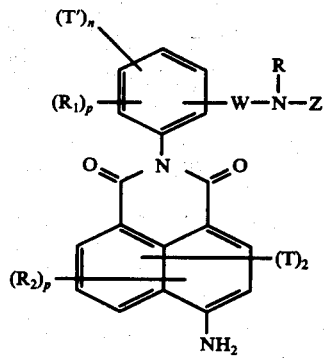

wherein
W is a direct bond, $C_1$-$C_4$-alkylene; cyclopentylene; cyclohexylene; cyclopentylene or cyclohexylene substituted with methyl, ethyl, or propyl but each containing no more than 8 carbon atoms; or phenylene;

T and T' are sulphonic acid, sulphonic acid alkali metal salt, or sulphonic acid ammonium salt, and $n$ is 0 or 1;

R is hydrogen; $C_1$-$C_4$-alkyl; $C_1$-$C_4$-alkyl substituted with hydroxyl, methoxy or ethoxy; benzyl; phenethyl; benzyl or phenethyl substituted with methyl, ethyl, methoxy, ethoxy or chlorine; phenyl; tolyl; xylyl; phenyl substituted with hydroxy, methoxy or ethoxy; cyclopentyl; cyclohexyl; or cyclopentyl or cyclohexyl substituted with methyl or ethyl if $n$ is 1; or sulfo-$C_1$-$C_4$-alkyl; sulphophenyl; sulphotolyl; sulphobenzyl; sulphophenethyl; or sulfocycloalkyl if $n$ is 0;

$R_1$ and $R_2$ are hydrogen, F, Cl, Br, $C_1$-$C_6$-alkyl, $C_1$-$C_6$-alkoxy, nitro, cyano, carbo-$C_1$-$C_5$-alkoxy, phenyl, or benzyl;

$p$ is 1, 2 or 3; and

Z is a polyamide- or cellulose-fiber reactive group comprising at least one reactive substituent bonded to a 5-membered or 6-membered heterocyclic ring containing at least one nitrogen atom.

2. Compound of claim 1 wherein
W is $C_1$-$C_4$-alkylene; phenylene, or cyclopentylene or cyclohexylene unsubstituted or substituted with methyl, ethyl, or propyl but each containing no more than 8 carbon atoms;

R is $C_1$-$C_4$-alkyl, phenyl, benzyl, phenethyl or cyclohexyl if $n$ is 1, and sulfo-$C_1$-$C_4$-alkyl if $n$ is 0, Z is 2,6-difluoro-5-chloro-4-pyrimidinyl, 2,3-dichloro-quinoxaline-6-carbonyl, or 2,4-dichloro-tri-azinyl-6;

$R_1$ and $R_2$ are hydrogen, F, Cl, Br, $C_1$-$C_3$-alkyl, or $C_1$-$C_3$-alkoxy; and $p$ is 1.

* * * * *